Figure 1:
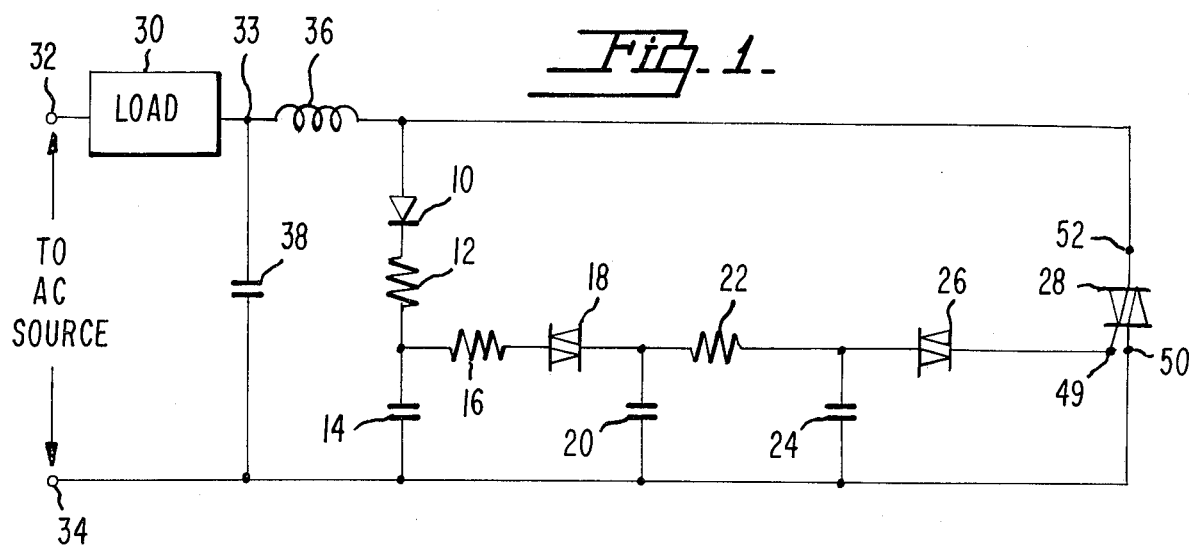

United States Patent [19]
Boggett

[11] 3,898,553
[45] Aug. 5, 1975

[54] CIRCUIT FOR SUPPLYING POWER TO A LOAD

[75] Inventor: Urbain Marcel Van Boggett, Sleutelhoflaan, Belgium

[73] Assignee: RCA Corporation, New York, N.Y.

[22] Filed: Apr. 26, 1974

[21] Appl. No.: 464,508

[52] U.S. Cl............ 323/19; 307/252 B; 315/200 A; 315/275; 323/24; 323/39
[51] Int. Cl.²............................................ G05F 3/04
[58] Field of Search..................... 307/252 B, 252 N; 315/200 A, 275, 307, DIG. 4; 323/16, 19, 22 SC, 24, 36, 39

[56] References Cited
UNITED STATES PATENTS

| | | | |
|---|---|---|---|
| 3,392,626 | 7/1968 | Miller et al. | 323/36 UX |
| 3,710,185 | 1/1973 | Switsen | 315/DIG. 4 |
| 3,763,396 | 10/1973 | Shilling | 323/36 UX |
| 3,781,649 | 12/1973 | Ishida | 323/22 SC |
| 3,789,383 | 1/1974 | Vasel | 323/39 X |
| 3,793,531 | 2/1974 | Ferrigno | 323/36 X |

*Primary Examiner*—A. D. Pellinen
*Attorney, Agent, or Firm*—H. Christoffersen; Samuel Cohen

[57] ABSTRACT

A circuit which periodically switches a load between its "off" (non-conducting) and "on" (conducting) states. The duration of each state is controllable, with states having periods in excess of one minute each realizable. The off time is a function mainly of the charging rate of one charging circuit while the on time depends mainly upon the rate at which charge stored by a second charging circuit is dissipated by a relaxation oscillator driven by the second charging circuit. The load is in series with the main conduction path of a gated thyristor, and the thyristor is turned on by the relaxation oscillator during each period the latter is oscillating.

10 Claims, 2 Drawing Figures

CIRCUIT FOR SUPPLYING POWER TO A LOAD

It has long been desired to replace mechanical and electromechanical devices with solid state circuitry in applications were it is desired repeatedly to energize and deenergize a load for controlled periods of time. Controlled switching devices such as the triac and silicon controlled rectifier (SCR) have been used in simple circuits to control the portion of a cycle of the alternating current supply voltage during which a load is conductive. However, when it is desired repeatedly to switch a load, with control of both the on and off times of this load, and with the range of on and off times each extending to as much as one minute and more, the presently available solid state circuits become quite complex. This complexity plus the relatively high cost of components has discouraged their more widespread use.

The present invention provides a solution to the above problem with a circuit that is reliable, compact and inexpensive. The circuit includes a first charge storage means and a circuit responsive to an alternating current supply voltage for charging the storage means to successively higher charge levels. It includes also a second charge storage means and a circuit responsive to a charge of greater than a given value in the first charge storage means for discharging a portion of the charge stored in the first charge storage means into the second charge storage means. An oscillator coupled to the second charge storage means is driven into oscillation when the charge stored by the second charge storage means exceeds a first threshold level and remains in oscillation until this charge reduces to a second substantially lower value. The oscillator closes a switch and a feedback circuit between the switch and first charging circuit maintains the latter inoperative so long as oscillations continue.

Figure 2:
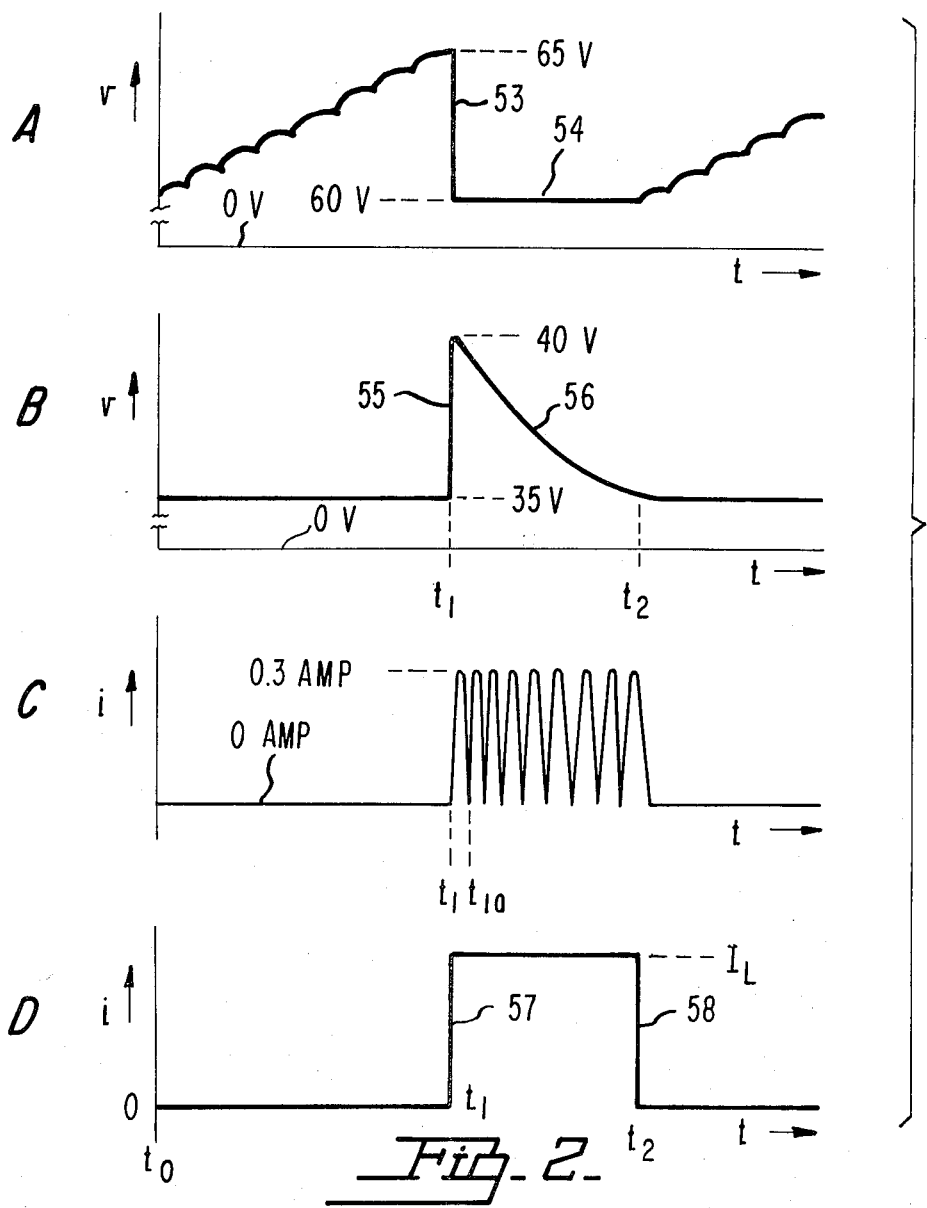

The invention is described in greater detail below and is illustrated in the drawing of which:

FIG. 1 is a schematic circuit diagram of a preferred embbodiment of the invention; and FIG. 2 is a drawing of waveforms to help explain the operation of the circuit of FIG. 1.

The circuit of FIG. 1 includes a pair of terminals 32, 34 to which an alternating current supply voltage, such as the ordinary 60 Hz. power line voltage, may be applied. A load 30 connects at one terminal to terminal 32 and at its other terminal 33 through capacitor 38 to terminal 34. Terminal 33 also connects through inductor 36 to a series charging circuit which includes, in the order named, diode 10, resistor 12 and capacitor 14. The circuit comprising resistor 16, diac 18 and capacitor 20, which circuit is connected across capacitor 14, functions as a threshold charging circuit. Resistor 22 and capacitor 24, connected across capacitor 20, comprise a third charging circuit. Diac 26 couples capacitor 24 to the control or gate electrode 49 of a thyristor 28, such as a triac. The control conduction path of the triac extends between the gate electrode and main terminal 50 of the triac.

The main conduction path of triac 28, which extends between main terminal 50 and main terminal 52 thereof, is connected at terminal 50 to supply voltage terminal 34 and at its other terminal 52 through inductor 36 to load terminal 33.

In the operation of the circuit of FIG. 1, assume that triac 28 initially is off, that is, current does not flow through its main conduction path. The voltage applied between terminals 32, 34, each time it is relatively positive at terminal 32 to an extent sufficient to forward bias the diode 10, causes current to flow through the load 30 and inductor 36 into the path comprising diode 10, resistor 12 and capacitor 14. The magnitude of this charging current is very much less than the normal load current. In the case, for example, in which the load is a motor, this current is insufficient to operate the motor and, in general, can be said to be insufficient to operate the load. The voltage across the charging circuit equals the voltage across the nonconducting triac which, in turn, essentially equals the source voltage. The rate at which capacitor 14 receives charge depends upon both the alternating voltage amplitude and the values of resistor 12 and capacitor 14.

The diac 18 is a device that exhibits hysteresis, that is, it starts to conduct at a first voltage $V_u$ and, once conducting, it does not cease conducting till it reaches a second lower voltage $V_L$. When the voltage across capacitor 14 increases to a value $V_u$ equal to the threshold or breakover voltage of diac 18, the latter conducts. The capacitor 14 now discharges through resistor 16 and diac 18 into capacitor 20. This discharge continues until the voltage across the diac reduces to $V_L$, whereupon the diac 18 cuts off and the cycle repeats.

The voltage waveform across capacitor 14 is shown in FIG. 2 at A. Each step in the "staircase" waveform corresponds to one period of the alternating current applied to terminals 32, 34. The portion 53 of wave A represents the discharge of capacitor 14 into capacitor 20 and occurs relatively rapidly compared to the charging time of capacitor 14. Wave B shows the charging and discharging of capacitor 20. Note that the discharge time (wave portion 56) is much longer than the charging time (wave portion 55). During the period $t_1$–$t_2$ when capacitor 20 is discharging, capacitor 14 does not charge (portion 54 of curve A) because triac 28 is on and the voltage across the main conduction path of the triac (which path is across circuit 10, 12, 14) is very low as discussed in more detail shortly.

The voltage across capacitor 24, because of the selection of the time constants, closely follows the voltage across capacitor 20 (wave B of FIG. 2). Resistor 22, capacitor 24, diac 26 and the gate electrode 49 to terminal 50 path of triac 28 comprise a relaxation oscillator circuit. When the voltage across capacitor 24 reaches the threshold potential $V_u$ of diac 26, the diac conducts. When it conducts, diac 26 switches from its relatively low current, relatively high voltage state to its relatively high current, relatively low voltage state, discharging capacitor 24 into the path 49–50, that is into the control or gate electrode of triac 28. Wave C shows the current flow through diac 26 as capacitor 24 discharges. The discharge continues for a short time such as $t_1$–$t_{1a}$ and then, when $V_L$ of diac 26 is reached, diac 26 turns off. This pulsing of the control electrode 28 occurs many times in succession during the discharge period $t_1$–$t_2$ of capacitor 20. The first such pulse turns on triac 28, providing a low impedance path between its terminals 50, 52 and operating current flows through load 30. Operating current will continue to flow for the entire period $t_1$–$t_2$ when pulses are present.

A thyristor will revert to its high impedance condition as soon as the a.c. supply voltage waveform reaches a zero value point. For this reason, the thyristor must be continuously supplied with triggering pulses at its control electrode if it is desired to maintain a flow of operating current through a load over a period of several cycles of the supply voltage. In the present application, the frequency of the gate pulses is chosen to be high with respect to the frequency of the a.c. source, i.e., on the order of 10–20 pulses per half cycle of a.c. source voltage. This high frequency ensures that the triac will be switched back to its low impedance condition very quickly after the a.c. supply voltage has passed through a zero value point. Conduction current through the load is thereby maintained over a very high percentage of each cycle of the supply voltage a.c. waveform.

Wave D represents the conduction state of the load. It is nonconducting with only the aforementioned charging current flowing through it until time $t_1$. At time $t_1$, the load conducts with full RMS operating current, $I_L$, flowing through it (wave D, edge 57).

When the triac turns on, the potential across the charging circuit reduces to almost zero (to the value of the on-state voltage across the triac). This stops the flow of charge into capacitor 14. However, the relaxation oscillator formed by resistor 22, capacitor 24, diac 26 and the gate conduction path 49-50 of triac 28 continues to operate with the energy being supplied by the charge stored in capacitor 20. Gate pulses C therefore continue to be produced until the capacitor 20 has discharged to the point where the voltage across capacitor 24 is no longer adequate to reach the threshold of diac 26. At this point, the gate pulses to the triac cease and the triac switches the load back to the nonconducting state (edge 58 of wave D).

The relaxation oscillations shown at C in FIG. 2 are actually at a frequency much higher than that shown (perhaps one hundred or so pulses may occur in the period $t_1$–$t_2$). The pulse period increases towards the end of the period of pulse generation due to the exponential nature of the decay of voltage across capacitor 20. As capacitor 20 discharges, it takes a greater amount of time to charge capacitor 24 to the voltage necessary to cause conduction of diac 26. When the gate pulses cease, the triac stops conducting at the instant when the a.c. voltage across the conduction path of the triac next passes through a zero value point. When the triac turns off, full line voltage again appears across its switch terminals, enabling the flow of charge to capacitor 14.

An important characteristic of the present circuit is that the time during which heavy current can be passed through the load (the "on" period) can be controlled to be well in excess of the period of the power supply a.c. voltage. The on-to-off period is controlled by the time constant of the charging circuit for capacitor 14 and the relative values of the capacitors 20 and 24 and resistors 16 and 22. The longer the time required to charge capacitor 14 to the value $V_u$, the longer the off period. Also, if diac 18 is selected such that a particular device is used having a relatively small difference between voltages $V_u$ and $V_L$, the off period can be increased. This is because it will take several conductions of this diac to charge capacitor 24 to the breakdown potential of diac 26. The on period may be increased by increasing the value of capacitor 20 and reducing the rate of discharge of this capacitor by the relaxation oscillator which supplies trigger pulses to the thyristor.

Inductor 36 and capacitor 38 comprise a filter for suppression of interference on the power lines that may be generated by the switching action of the triac.

One embodiment of the subject invention used resistance values of 100,000; 10 and 4,700 ohms for resistors 12, 16 and 22, respectively. Capacitors 14, 20 and 24 were 25, 25 and .047 microfarads, respectively. Also, diacs 18 and 26 were selected such that the $\Delta V$ ($V_u$–$V_L$) was greater than 15 volts for diac 18 and less than 15 volts for diac 26. Under the above conditions, the load on/off times were approximately 150 200 200 milliseconds, respectively, when the circuit was connected to a 50Hz 220 volt source of a.c. power. The particular on/off times were chosen because the load was to be a flashing traffic light.

The above-described circuit provides the desired switching function in a package having only two external terminals, thus reducing connections to source and load to a minimum. The feature of ease of connection to the external circuitry coupled with the relatively few components used could be exploited by packaging the circuit in a configuration compact enough to be inserted into a conventional lamp socket. A second socket may be provided on the circuit package into which a light bulb or other load may be inserted. This circuit is ideally suited for the control of loads such as electric motors, alarms, appliances and lights, especially lights used in traffic flasher application.

What is claimed is:

1. A circuit for intermittently applying alternating current power to a load, said circuit comprising, in combination:

first and second terminals to which an a.c. operating voltage may be applied, said load being connected at one terminal to said first terminal;

a first charging circuit comprising first charge storage means connected between the other terminal of said load and said second terminal;

a second charging circuit comprising a first threshold element and an impedance essentially in series with a second charge storage means, said second charging circuit being connected across said first charge storage means, said second charge storage means for receiving a charge from said first charge storage means whenever the voltage across said first charge storage means exceeds the voltage across said second charge storage means by the value of the threshold voltage of said threshold element;

a control current responsive switch having a control terminal for receiving a control current and having two switch terminals, one coupled to said second terminal and the other coupled to said other terminal of said load, said latter connection comprising a feedback path, whereby the application of charging voltage to said first charging circuit is controlled by the state of said switch, said switch closing causing charge to cease flowing into said first charging means and said switch opening permitting charge to flow into said first charging circuit; and means for closing said switch comprising an impedance, a third charge storage means and a second threshold element, said second element connected between said third charge storage means and said control terminal, said impedance and said third charge storage means connected across said second charge storage means, control current being applied to said control terminal of said switch whenever voltage across said third charge storage means equals the threshold of said second threshold element.

2. The combination recited in claim 1 wherein said first charging circuit further includes:
   an impedance; and
   a unilaterally conducting device, said first charge storage means receiving energy from said operating voltage source through said impedance and unilaterally conducting device whenever the instantaneous value of said operating voltage exceeds the value of the potential across said first charge storage means by an amount sufficient to forward bias said unilaterally conducting device.

3. The combination recited in claim 1 wherein said first and second threshold elements comprise devices having hysteresis characteristics when conductive, whereby the voltage drops across said first and second threshold elements equals the threshold voltage for each element upon conduction and said element remains conductive until said associated voltage drop has decreased to a second lower voltage, at which point said element ceases conducting, said conduction providing a discharge path for said first and third charge storage means, respectively, said charge storage means discharging until voltage across respective elements is inadequate to maintain conduction of said elements, causing said elements to cease conduction thereby enabling the respective charge storage means to attempt to charge once more to a voltage that would equal said threshold voltage.

4. In combination:
   first and second charge storage means;
   a first charging circuit including, in its charging path, an asymmetrically conducting element, said circuit connected across said first charge storage means and responsive to an alternating current supply voltage for charging said first charge storage means to successively higher charge levels;
   a second charge storage circuit coupled to said first charge storage means and including a threshold device, said device responsive to charge of greater than a given value stored in said first charge storage means for discharging a portion of the charge stored in said first charge storage means into said second charge storage means;
   a relaxation oscillator coupled to said second charge storage means and responsive to the charge stored therein for being driven into oscillation when the charge in said second charge storage means exceeds a given first level and for remaining in oscillation until said charge reduces to a second substantially lower level;
   a switch having a main conduction path and a control conduction path, the main conduction path exhibiting a low impedance when relaxation oscillations are supplied to said control conduction path and a high impedance in the absence of such oscillations, said control conduction path coupled to said relaxation oscillator for receiving the oscillations produced thereby; and
   a feedback circuit connected between said main conduction path and said first charging circuit for rendering the latter inoperative when the main conduction path of said switch exhibits a low impedance.

5. In the combination as set forth in claim 4, said second charging storage circuit threshold device having an upper threshold voltage $V_u$ and a lower threshold voltage $V_L$, said device being rendered conductive when the charge stored in said first charge storage means reaches a value such that $V_u$ appears across said device and said device being rendered nonconductive when the charge stored in said first charge storage means has reduced in value to a substantially lower level such that $V_L$ appears across said device.

6. In the combination as set forth in claim 5, said device comprising a diac.

7. In the combination as set forth in claim 4, said relaxation oscillator comprising a third charge storage means, a circuit coupled to said second charge storage means for charging said third charge storage means from said second charge storage means, and a device coupled between said third charge storage means and the control conduction path of said switch, said device having an upper threshold $V_u$ at which it is rendered conductive and passes a portion of the charge stored in said third charge storage means into said control conduction path and a lower threshold $V_L$ at which said device cuts off and stops the flow of charge from said third charge storage means into said control conduction path.

8. In the combination as set forth in claim 7, said device comprising a diac.

9. In the combination as set forth in claim 4, said switch comprising a thyristor, said main conduction path comprising the first main terminal to second main terminal path through said thyristor and said control conduction path comprising the gate electrode to first main terminal path of said thyristor.

10. In combination:
    first and second charge storage means;
    a first charging circuit including, in its charging path, an asymmetrically conducting element, said circuit connected across said first charge storage means and responsive to an alternating current supply voltage for charging said first charge storage means to successively higher charge levels;
    a second charge storage circuit coupled to said first charge storage means and including a threshold device responsive to charge of greater than a given value stored in said charge storage means for discharging a portion of the charge stored in said first charge storage means into said second charge storage means;
    an oscillator coupled to said second charge storage means and responsive to the charge stored therein for being driven into oscillation when the charge in said second charge storage means exceeds a given first level and for remaining in oscillation until said charge reduces to a second substantially lower level;
    a switch having a control terminal, which switch is rendered conductive in response to oscillations applied to said control terminal, said control terminal being connected to receive the oscillations produced by said oscillator; and
    a feedback circuit connected between said switch and said first charging circuit for connecting said switch across said charging circuit thereby rendering the latter inoperative when the oscillations close said switch.

* * * * *

UNITED STATES PATENT OFFICE
CERTIFICATE OF CORRECTION

Patent No. 3,898,553  Dated August 5, 1975

Inventor(s) Urbain Marcel Van Pogget

It is certified that error appears in the above-identified patent and that said Letters Patent are hereby corrected as shown below:

The name of the inventor is misspelled. It should be Urbain Marcel Van Bogget, NOT Boggett.

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*